No. 619,925. Patented Feb. 21, 1899.
C. H. ARFT & J. TESSIN.
PLOW.
(Application filed Nov. 11, 1898.)
(No Model.) 2 Sheets—Sheet 1.
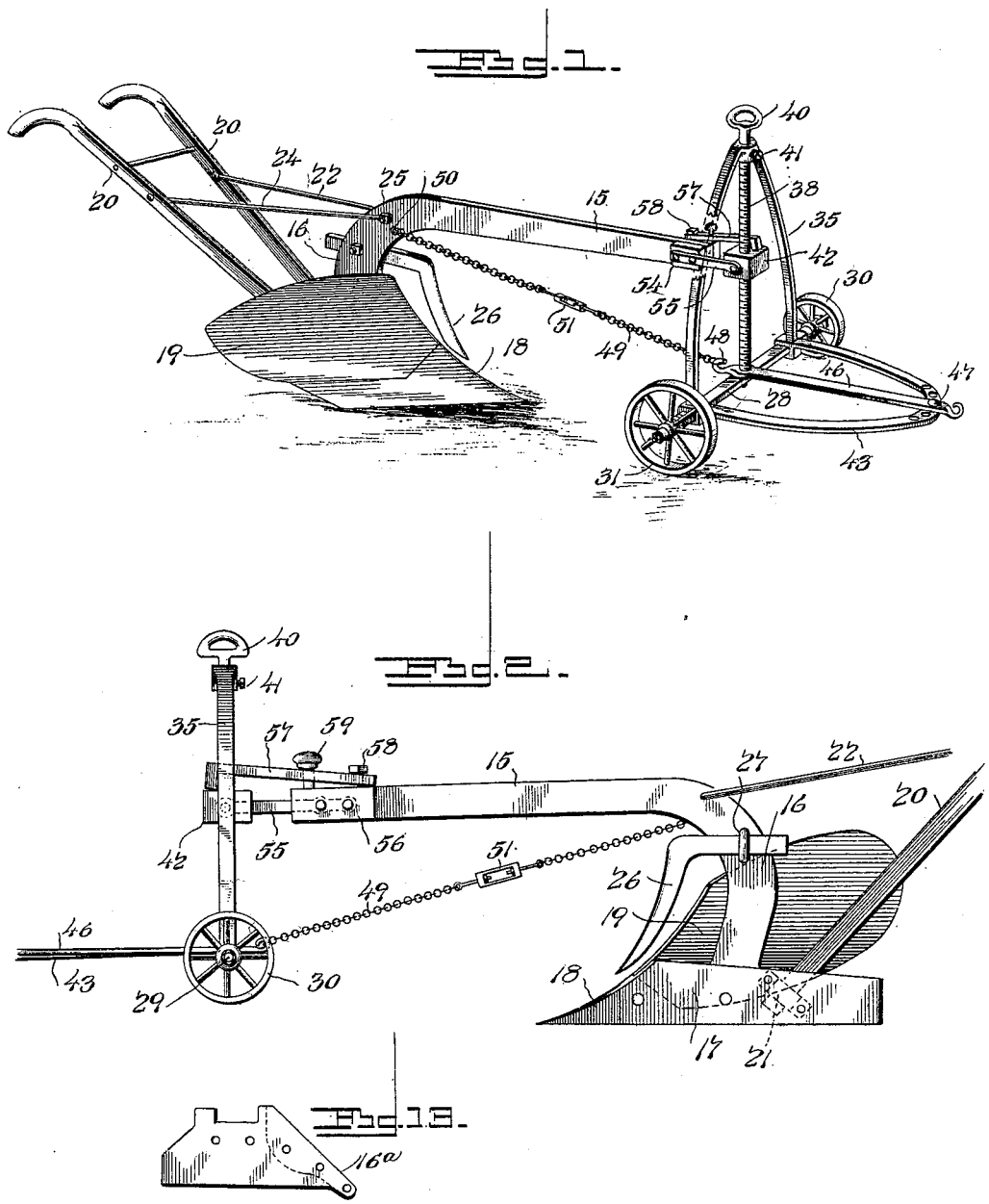
Witnesses
E. F. Stewart
H. F. Bernhord
By Their Attorneys.
Charles H. Arft } Inventors
John Tessin
C. A. Snow & Co.
THE NORRIS PETERS CO., PHOTO-LITHO., WASHINGTON, D. C.

No. 619,925. Patented Feb. 21, 1899.
C. H. ARFT & J. TESSIN.
PLOW.
(Application filed Nov. 11, 1898.)
(No Model.) 2 Sheets—Sheet 2.
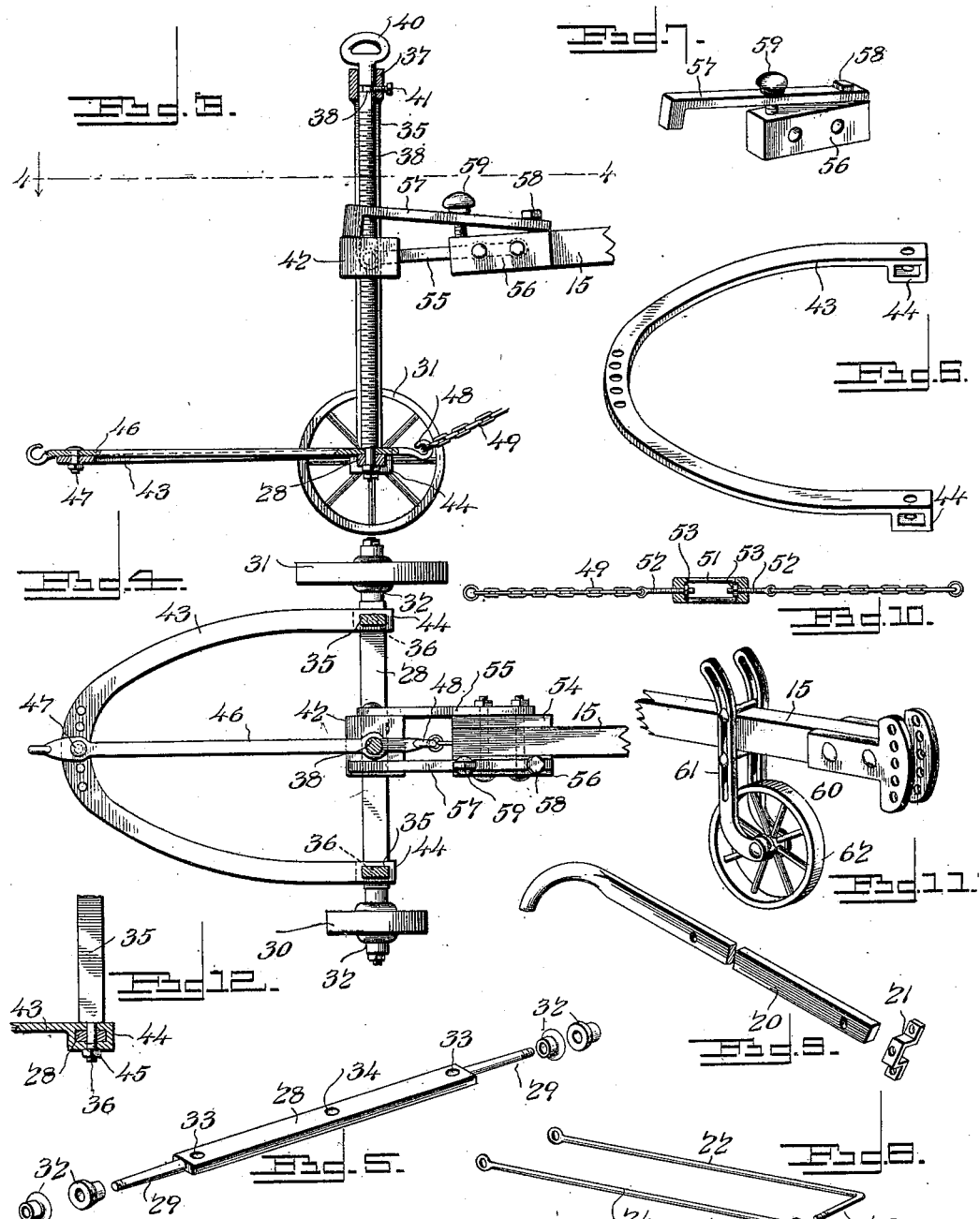
Witnesses
E. K. Stewart
H. F. Bernhard
Charles H. Arft  Inventors
John Tessin
By Their Attorneys,
C. A. Snow & Co.

UNITED STATES PATENT OFFICE.

CHARLES H. ARFT AND JOHN TESSIN, OF RICHLAND, SAGINAW COUNTY, MICHIGAN.

PLOW.

SPECIFICATION forming part of Letters Patent No. 619,925, dated February 21, 1899.

Application filed November 11, 1898. Serial No. 696,157. (No model.)

*To all whom it may concern:*

Be it known that we, CHARLES H. ARFT and JOHN TESSIN, citizens of the United States, residing at Laporte P. O., Richland township, in the county of Saginaw and State of Michigan, have invented a new and useful Plow, of which the following is a specification.

Our invention relates to plows, and one object is to provide an attachment to be used in connection with ordinary plows for regulating the adjustment of the beam to change the penetration of the share or point and to ease the draft by holding up the beam and bringing the draft directly on the beam at a point above the moldboard.

Our improvements are distinguished from ordinary sulky-plows in that the attachment is located at the front end of the beam and does not carry the weight of the plow. Ordinary sulky-plows have ground and furrow wheels disposed on opposite sides of the beam at a point intermediate of its length, which arrangement is objectionable in that the strain and draft are increased on the implement, especially where the soil is irregular, as in plowing under "corn-stubbles."

The invention consists in the novel combination of elements and in the construction and arrangement of parts, as will be hereinafter fully described and claimed.

To enable others to understand the invention, we have illustrated the same in the accompanying drawings, forming a part of this specification, and in which—

Figure 1 is a perspective view of a plow embodying our invention, looking at the moldboard. Fig. 2 is an elevation of the landside of the plow. Fig. 3 is a vertical longitudinal section through the adjusting mechanism for the plow-beam, showing a fragment of the latter. Fig. 4 is a horizontal sectional plan view on the plane indicated by the dotted line 4 4 of Fig. 3. Fig. 5 is a detail perspective view of the carrying-axle. Fig. 6 is a detail perspective view of the draft-bail. Fig. 7 is a detail perspective view of one of the beam-blocks with an adjustable lever for balancing the plow-beam on its connection with the adjustable nut by which is controlled the position of the plow-beam. Figs. 8 and 9 are detail views of the plow-braces and one of the handle-bars. Fig. 10 is a detail view of the extensible draft-chain. Fig. 11 is a detail view of the beam with an ordinary clevis and caster-wheel which may be used under certain conditions. Fig. 12 is a fragmentary sectional elevation of parts of the arch and the draft-bail to show the method of joining said parts to the axle. Fig. 13 is a detail of the foot-plate to which the beam-standard, the moldboard, the share, and the landside are united.

Like numerals of reference denote like and corresponding parts in each of the several figures of the drawings.

15 designates the plow-beam, which is provided at its rear end with a standard or stock 16, that carries a foot-piece $16^a$, to which are united the share, landside, and moldboard. The landside 17 is flattened at its lower edge to prevent cutting into the furrow, and the share 18 is secured in the usual way to the foot-piece on the standard or stock. The upper edge of the share is recessed to receive the lower edge of the moldboard 19, and to the moldboard and the landside are fastened the lower ends of the handle-bars 20, box-loops 21 being secured over the lower ends of said handle-bars to strengthen the joint between the latter, the landside, and the moldboard. The handle-bars are braced by a brace-rod 22, which is provided at its lower end with an angular threaded arm 23, that passes through an opening in the beam-stock 16, and over this threaded arm 23 is fitted the eye of the brace-rod 24, the contiguous ends of said brace-rods being fastened together by a nut 25, which is screwed on the arm 23. The upper rear ends of the braces are fastened to the handle-bars, and thus the braces are attached to the beam and the handles to render the latter stiff and rigid.

A colter 26 is in operative relation to the share and moldboard, and said colter has an arm which is arranged to lap the standard 16. An adjustable clamp 27 is fastened to the stock or standard to receive this arm of the colter, and by loosening the clamp the colter may be adjusted to cut the required depth, after which the clamp should be again tightened to firmly secure the colter in place.

The means for adjusting the plow-beam to regulate the penetration of the share and to ease the draft on the implement are located at the front end of the beam. The adjusting means is in the nature of an attachment which may be employed in connection with ordinary plows, and this attachment has a horizontal axle 28, which is adapted to be arranged transversely across the plane of the plow-beam at a point substantially in advance of the latter. This axle is provided with the wheel-spindles 29, and on one spindle is loosely arranged the landside-wheel 30, while the other axle-spindle carries the furrow-wheel 31, the last-named wheel being of greater diameter than the landslide-wheel 30 in order that it may travel in the furrow and maintain the axle in a substantially horizontal position. On each axle-spindle is secured a pair of dust-cups 32, which embrace the ends of the wheel-hub and serve to exclude dirt and dust from entering said hub and wearing the spindle or the hub. The axle is furthermore provided within the wheel-spindles with vertical apertures 33, adapted to receive threaded tenons on a vertical arch, and at its center the axle is provided with a vertical opening 34 for the reception of the lower extremity of a threaded adjustment-spindle, presently described. The arch 35 occupies a vertical position immediately over the axle and in advance of the beam, so as to span the plane of said beam, and at its lower extremities this arch is provided with the threaded tenons 36, that are adapted to pass through the openings 33 of the axle and through loops of a horizontal draft-bail, and this arch is furthermore provided with a central vertical opening 37, adapted to receive loosely the vertical adjusting-spindle 38. This spindle passes through the opening 37 in the arch and the opening 34 of the axle, and the spindle is constructed with an annular groove 39 at a point below the hand-wheel 40, which is fast with the upper extremity of said spindle. The annular grooved portion 39 of the spindle lies in the horizontal plane of the central opening 37 in the arch, and in the arch is mounted a confining-screw 41, the inner extremity of which fits in the annular groove 39 of the spindle for the purpose of preventing endwise movement of the spindle, while permitting it to turn freely on its axis when the hand-wheel is manipulated. The adjusting-spindle is provided with a male screw-thread, and on said spindle is fitted the adjusting-nut 42, which is operatively connected with the front end of the plow-beam.

A draft-bail 43 is arranged in a horizontal position in advance of the wheeled axle, and this bail has loops 44, which are fitted loosely around the axle 28 at the points where the openings 33 are formed therein. The threaded tenons 36 of the arch 35 pass through the axle and the loops of the draft-bail, and these tenons receive the clamping-nuts 45, whereby the arch in the draft-bail is attached to the axle at common points.

A draft-bar 46 is arranged centrally within the draft-bail, and this draft-bar is connected at its front end with the draft-bail by an adjustable bolt 47. The rear end of the draft-bar is provided with a hook 48, to which is connected one of the links of a draft-chain 49, which extends alongside of the beam, and the rear end of this chain is fastened to a draft bolt or eye 50, which is secured at a point above the moldboard. It is evident that a singletree may be connected to the front end of the draft-bar, or, if desired, a doubletree may be attached to the draft-bar for hitching a team of horses to the implement. The bolt 47 is made adjustable by shifting its position from one opening to another of a series of openings provided at the front threaded ends of the draft-bail 43, and the angle of the draft-bar to the line of the plow-beam may be shifted or changed as required. The draft-chain 49 is made extensible at a point between its connection to the draft-bar and the plow-beam. A swivel 51 is provided between two sections of the draft-chain, and this swivel receives an adjustable bolt 52, which is attached to one section of the draft-chain, while the other end of the bolt is equipped with a nut 53, that bears against the swivel 51 and is adjustable on the bolt to lengthen or shorten the draft-chain.

The connection between the plow-beam and the regulating-nut 42 is effected by means of devices that operatively connect the nut and beam in a manner to balance the beam and make it assume its correct position with reference to the adjusting appliance. A block 54 is fastened securely to one side of the beam, and this block has a link 55, which is pivotally attached to one side of the regulating-nut 42. To the opposite side of the plow-beam, at the front end thereof, is secured another block 56, and on this last-named block is mounted a lever 57, which is fulcrumed at 58 to the block. This lever extends in advance of the block 56 for its angular end to bear upon the regulating-nut on the opposite side of the latter from the pivotal attachment of the link 55 thereto, and this lever is equipped with a screw 59, that is adapted to bear upon the block 56. It will be observed that the regulating-nut is connected loosely with the plow-beam at one side of the axial line of said beam, and to counterbalance the pull on the regulating-nut and insure correct position of the several parts we employ the lever and the adjusting-screw therefor to connect the opposite end of the nut with the beam.

The plow-beam may be raised or lowered by rotating the spindle 38 in one direction or the other to change the elevation of the nut 42, which, owing to its connection with the beam, causes the beam to be correspondingly adjusted. The attachment may be readily applied to ordinary plows, and its parts are simple in construction and efficient in operation.

It is evident that our attachment may be disconnected from the plow, and in lieu thereof an ordinary clevis 60 may be attached to the beam and a hanger 61 fastened to said beam for the purpose of supporting the caster-wheel 62, all as represented by Fig. 11.

The hanger is slotted vertically and connected to the beam by bolts which permit the caster-wheel and hanger to travel in a vertical direction.

Changes may be made in the form of some of the parts, while their essential features are retained and the spirit of the invention embodied. Hence we do not desire to be limited to the precise form of all the parts, as shown, reserving the right to vary therefrom.

What we claim is—

1. In a plow, the combination with a wheeled axle, a vertical arch fixed thereto and a beam, of a vertical screw-spindle supported in the arch and the axle, a traveling nut on said spindle, a link fastened securely to one side of the beam and pivoted to the traveling nut, a lever arranged on the opposite side of the screw-spindle from the link and connected at one end to the beam and having its other end bearing on the nut, and a regulating-screw between the lever and the beam, substantially as described.

2. In a plow, a wheeled axle having the transverse openings within its spindles, a draft-bail provided with cuffs fitted to the perforated parts of the axle, a vertical arch having its threaded lower ends extended through the cuffs of the bail and the axle, and nuts screwed on said threaded ends of the arch and clamping the bail, the axle, and the arch firmly together, combined with a screw-spindle, a traveling nut thereon, and a beam connected operatively with the nut, substantially as described.

3. In a plow, the combination with a beam, and a wheeled axle, of the draft-bail fast with said axle, a vertical arch having at its upper end a central sleeve-bearing and secured at its lower end fast to the axle, a screw-spindle provided with smooth ends, one of which is stepped in the axle and the other is grooved to fit in the sleeve-bearing of the arch, a stop-screw mounted in the arch-bearing and engaging the grooved part of the spindle, a draft-bar loosely fitted near its rear end on the lower smooth extremity of the screw-spindle and having its rear extremity extended beyond the axle, an extensible draft-chain connected to said extended rear end of the draft-bar and to the beam, and means for adjustably confining the draft-bar on the draft-bail, substantially as described.

In testimony that we claim the foregoing as our own we have hereto affixed our signatures in the presence of two witnesses.

CHARLES H. ARFT.
JOHN TESSIN.

Witnesses:
LOUIS SMITH,
F. E. EMERICH.